(12) United States Patent
Yamauchi et al.

(10) Patent No.: US 8,499,315 B2
(45) Date of Patent: Jul. 30, 2013

(54) GROUNDING STRUCTURE FOR OPTICAL DISC DRIVE

(75) Inventors: Yoshiaki Yamauchi, Omitama (JP); Seiji Hamaie, Kawasaki (JP); Ikuo Nishida, Ebina (JP); Koji Matsumoto, Tokyo (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/275,353

(22) Filed: Oct. 18, 2011

(65) Prior Publication Data

US 2012/0096479 A1     Apr. 19, 2012

(30) Foreign Application Priority Data

Oct. 18, 2010  (JP) ................................. 2010-233610

(51) Int. Cl.
*G11B 33/14*      (2006.01)

(52) U.S. Cl.
USPC .......................................................... 720/650

(58) Field of Classification Search
USPC ................. 720/600, 601, 606, 609, 610, 613, 720/645–648, 650, 652, 654, 655, 657
See application file for complete search history.

(56) References Cited

U.S. PATENT DOCUMENTS

| 7,607,146 B1 * | 10/2009 | Black et al. .................... 720/732 |
| 2005/0105452 A1 * | 5/2005 | Kimura .......................... 369/121 |
| 2011/0035761 A1 * | 2/2011 | Ueno ............................. 720/601 |

FOREIGN PATENT DOCUMENTS

| JP | 2004-152433 | 5/2004 |
| JP | 2008-152844 | 7/2008 |
| WO | WO 2009130768 A1 * | 10/2009 |

* cited by examiner

*Primary Examiner* — Nathan Danielsen
(74) *Attorney, Agent, or Firm* — Antonelli, Terry, Stout & Kraus, LLP.

(57) ABSTRACT

An optical disc drive including a conductive plate provided on a front surface of a disc tray. The conductive plate includes a structure of a hook portion at two places on the right and left and a structure of a pressure bar spring on the side end, in which the conductive plate is fixed using hook holes provided on the disc tray and the pressure bar spring presses and grounds a cabinet with the disc tray loaded in the inside of the cabinet.

10 Claims, 5 Drawing Sheets

GROUNDING STRUCTURE FOR OPTICAL DISC DRIVE

BACKGROUND OF THE INVENTION

1. Field of the Invention

The present invention relates to an optical disc drive having a conductive plate that prevents the malfunction or destruction of electronic components caused by static electricity discharge (ESD).

2. Description of the Related Arts

When a user charged with static electricity touches a front bezel (an eject switch for a disc tray or the like) in order to operate an optical disc drive, the electricity is conducted from electronic components mounted on the back surface of the front bezel to a control circuit through the front bezel, and the electricity causes malfunction on the electronic components of the control circuit, or the electricity is likely to damage electronic components in some cases.

Moreover, the electricity sometimes causes electrostatic discharge damage also to electronic components (a laser diode or the like) incorporated in an optical pickup that reproduces information on the disc surface or records information on the disc surface.

For conventional techniques to meet these problems, there is a structure in which static electricity discharged in a front bezel is carried to a metal cover to be a shell for an optical disc drive through a grounding plate (referred to as a conductive plate below) for guiding the static electricity to an earth part and the metal cover is grounded to a PC main body, so that the static electricity is prevented from being discharged to electronic components, a laser diode, or the like as described above.

For example, Japanese Patent Application Laid-Open Publication No. 2004-152433 discloses a U-shaped conductive plate having a bent portion on the upper and lower part, the U-shaped conductive plate having a nail piece structure in which a rectangular opening is provided on the bent portions. The conductive plate forms a mounting structure on a disc tray having a retain projection including a projection provided at locations facing the nail pieces of the conductive plate. Moreover, a structure is disclosed in which the releasing end portion of the conductive plate is contacted with a chassis case to be a drive main body in loading the disc tray into the inside of a drive.

In addition, Japanese Patent Application Laid-Open Publication No. 2008-152844 discloses a structure of a conductive plate for static electricity discharge in which a conductive plate has a retain portion and a mounting part on the upper part and the side part each at one place and bosses provided on a disc tray are inserted into alignment holes in the conductive plate.

SUMMARY OF THE INVENTION

The technique described in Japanese Patent Application Laid-Open Publication No. 2004-152433 has the nail piece structure on the upper and lower part of the conductive plate in which the conductive plate is formed in a U-shaped leaf spring having a bend on the upper and lower part. Since a mounting structure is formed in which the tip end portion of the disc tray is caught in the conductive plate in this structure, it is necessary to provide the internal dimensions of the U-shaped bend greater than the height dimension of the tip end portion of the disc tray.

Thus, in consideration of a reduction in the thickness of the disc drive, the mounting structure of components such as a conductive plate is also a problem of a reduction in the thickness. Although it is possible to consider the plate thickness of the conductive plate with a small recess in the disc tray, there are concerns that strength might not be enough in this case because of a reduction in the thickness.

Moreover, the technique described in Japanese Patent Application Laid-Open Publication No. 2008-152844 is the structure of the conductive plate for static electricity discharge in which the conductive plate has the retain portion and the mounting part on the upper part and the side part each at one place and the bosses provided on the disc tray are inserted into the alignment holes in the conductive plate.

In this structure, for the pressing force against the disc tray side, only applied are the spring force of the retain portion provided on the side surface of the conductive plate and the friction between the bosses provided on the disc tray and the alignment holes. The mounting part on the upper part operates as only the rotational positioning for the bosses.

Namely, when the opposite end portion of the retain portion floats, it is likely that the contact state between the retain portion and the conductor part of a circuit board becomes unstable.

It is an object of the present invention to provide a structure that can reliably ground static electricity discharged in an optical disc drive and to provide an optical disc drive that improves processing accuracy of components and reduces costs.

The aforementioned object can be achieved by an optical disc drive including: a cabinet formed of a top case and a bottom case, the cabinet having an opening thereon; a disc tray housed in an inside of the cabinet and provided to be loaded and unloaded through the opening; an optical pickup configured to record and reproduce information on a disc on the disc tray; a spindle motor configured to rotate and drive the disc; and a conductive plate provided on a front end portion of the disc tray, wherein: the conductive plate includes: a hook portion provided on a tip end portion of the conductive plate at two places on right and left, the hook portions having a two-step bend, the hook portions being faced inward to each other; and a pressure bar spring portion provided on a side end of the conductive plate, the pressure bar spring portion having a one-step bend; the conductive plate is fixed to hook holes provided on a front surface of the disc tray using the hook portions; and the pressure bar spring portion is contacted and grounded to a shell with the disc tray loaded in the inside of the cabinet.

Moreover, for the aforementioned object, preferably, the pressure bar spring portion is bent in a direction of the disc tray.

Furthermore, for the aforementioned object, preferably, a vertical internal dimension of the hook hole provided on the disc tray is formed with a positive tolerance ranging from 0.05 to 0.2 mm with respect to a width dimension of the hook portion provided on the conductive plate.

In addition, for the aforementioned object, preferably, an inlet side of the hook hole provided on the disc tray is beveled.

Moreover, for the aforementioned object, preferably, an upper and lower surface of an inlet of the hook hole provided on the disc tray are beveled.

According to the present invention, it is possible to provide a structure that can reliably ground static electricity discharged in an optical disc drive, and to provide an optical disc drive that improves processing accuracy of components and reduce costs.

BRIEF DESCRIPTION OF THE INVENTION

The present invention will become fully understood from the detailed description given hereinafter and the accompanying drawings, wherein.

DETAILED DESCRIPTION OF THE PREFERRED EMBODIMENTS

Figure 1:
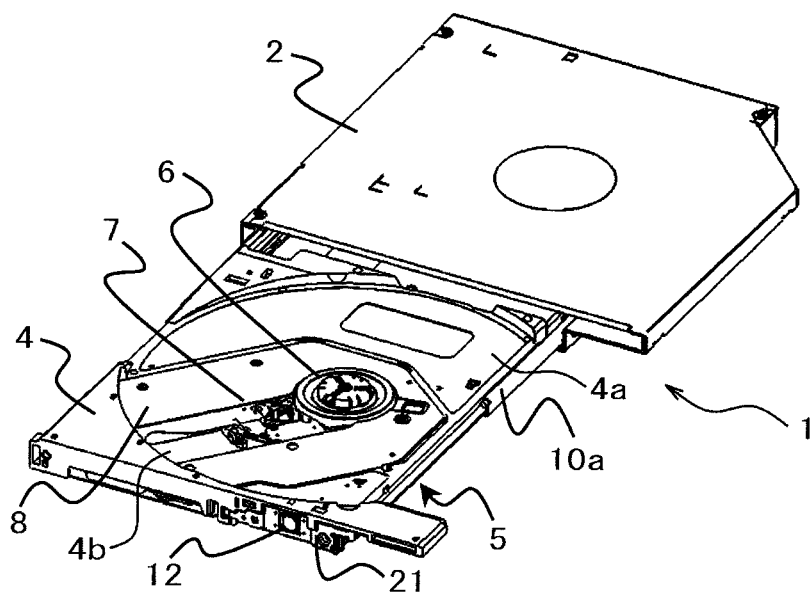
FIG. 1 is a perspective view depicting an optical disc drive according to an embodiment of the present invention.

In the following, embodiments of the present invention will be described with reference to the drawings. The schematic configuration of a typical optical disc drive will be described in FIGS. 1 and 2, prior to explaining the embodiments.

It is noted that since portions with the same reference numerals and signs express the same components in FIGS. 1 to 9 and the basic configuration and operation thereof are the same, the description of the components with the same reference numerals and signs once explained is omitted.

FIG. 1 is a perspective view depicting an optical disc drive according to an embodiment of the present invention.

Figure 2:
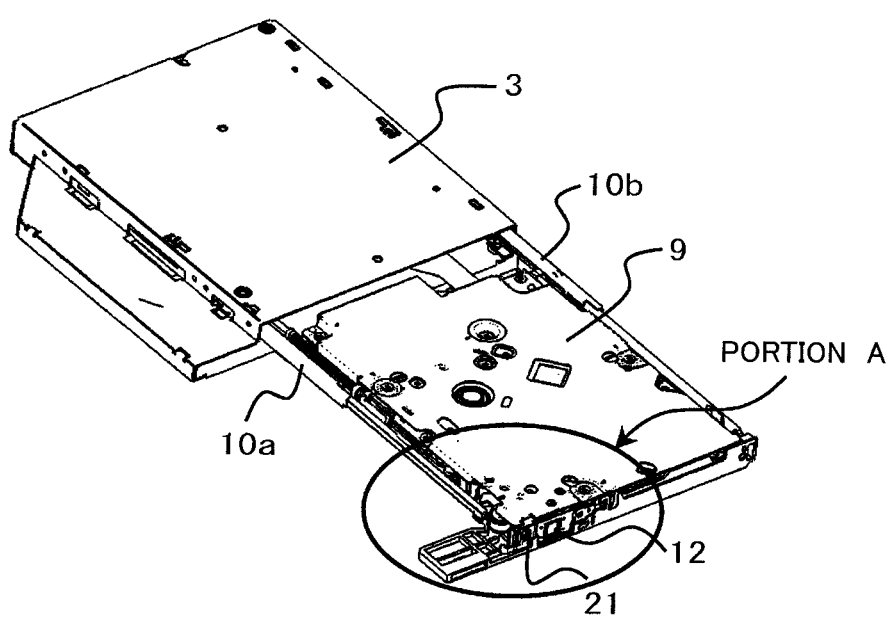
FIG. 2 is a perspective view depicting the optical disc drive shown in FIG. 1, which is seen from below.

FIG. 2 is a perspective view depicting the optical disc drive shown in FIG. 1, which is seen from below.

In FIGS. 1 and 2, an optical disc drive 1 records and reproduces information on the recording surface of a recording medium (referred to as an optical disc below) such as a CD, DVD, and BD (Blu-ray disc) having a diameter of 120 mm and a thickness of 1.2 mm.

The optical disc drive 1 targeted in the present invention is generally an optical disc drive 1 called a slim (or super-slim) drive in a thin box shape having a width of 130 mm, a depth of 130 mm, and a device thickness of 12.7 mm (or 9.5 mm), which is equipped in a mobile personal computer.

This optical disc drive 1 is formed of a shell that a top case 2 and a bottom case 3 shown in FIG. 2 are assembled by fitting and screwing them to each other. The top case 2 and the bottom case 3 are fabricated by press-molding a thin steel sheet. A disc tray 4 of a resin molded component is provided in the inside of the shell (in the inside of the optical disc drive 1). A front bezel (not shown) is mounted on the front end of the disc tray 4, from and into which a disc is unloaded and loaded. A unit mechanism 5 is mounted on the under surface of the disc tray 4.

The unit mechanism 5 is mounted on the disc tray 4 through a plurality of insulators (not shown) formed of elastic members. The insulators can damp vibrations or impacts carried from the outside of the drive to the unit mechanism 5, or can damp vibrations or impacts carried from the unit mechanism 5 to the outside.

The unit mechanism 5 has a unit mechanism chassis (not shown) to be a base. This unit mechanism chassis is mounted with a spindle motor 6 that rotates and drives a disc, an optical pickup 7 that reproduces information on the recording surface of the disc or records information on the recording surface, a drive means (not shown) for moving this optical pickup 7 along the radial direction of the disc, and an upper cover 8 that prevents these components from being contacted or blocks electrical noise. A lower cover 9 is mounted on the lower part of the disc tray 4 as shown in FIG. 2.

A circular groove 4a is formed in the center of the disc tray 4, whose diameter is slightly greater than the outer diameter of the disc. A notch hole 4b is provided in a part of the bottom surface of the circular groove 4a, and the upper cover 8, the optical pickup 7, and the spindle motor 6 of the unit mechanism 5 are exposed from this notch hole 4b.

A conductive plate 21 is mounted on the front end surface of the disc tray 4 in the inner side of the front bezel (not shown), and static electricity is discharged to the bottom case 3 to be a cabinet through the conductive plate 21.

The disc is loaded and unloaded by a user pressing an eject switch 12 mounted on the front bezel, so that the disc tray 4 slides on guide rails 10a and 10b provided on the both sides of the disc tray 4 and protrudes to the outside of the optical disc drive 1.

Various investigations were conducted on the optical disc drive 1 like this for the mounting structure of the conductive plate 21 on the disc tray 4, in which the conductive plate 21 is provided in order to prevent malfunction of or static electricity damage to the electronic components or the like in the inside of the optical disc drive 1, the malfunction or static electricity damage being caused by static electricity produced when a user touches the eject switch 12 or the like on the front bezel in manipulating the optical disc drive 1 by the user. Consequently, embodiments below were obtained in the present invention.

First Embodiment

In the following, an embodiment of the present invention will be described with reference to FIGS. 3 to 7. It is noted that in FIG. 2, a portion A indicated by a circle expresses a conductive plate 21 according to the present invention and a region surrounding the conductive plate 21, and FIG. 3 is an enlarged diagram showing the portion A.

Figure 3:
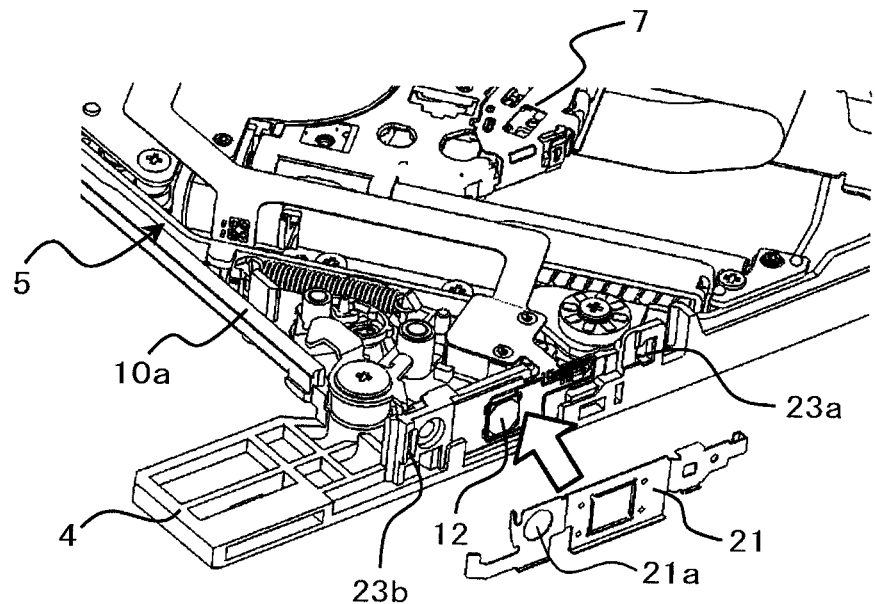
FIG. 3 is an enlarged perspective view depicting a conductive plate shown in FIG. 2.

FIG. 3 is an enlarged perspective view depicting the portion A shown in FIG. 2, and an arrow indicates the direction in which the conductive plate 21 is mounted on a disc tray 4.

Figure 4:
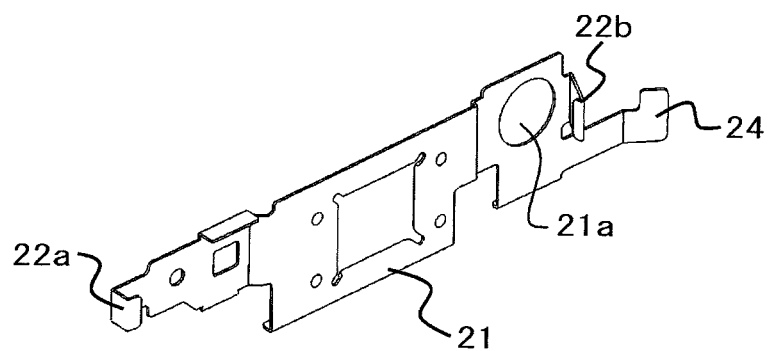
FIG. 4 is an enlarged perspective view depicting the conductive plate according to an embodiment of the present invention.

FIG. 4 is a perspective view depicting the shape of the conductive plate 21.

In FIGS. 3 and 4, the conductive plate 21 is a press-molded component that a thin steel sheet is bent (the plate thickness ranges from 0.3 to 0.5 mm). The center portion of this conductive plate 21 is formed with a through opening for an eject switch 12 to unload the disc tray 4, and a through opening (not shown) that forcedly unload the disc tray 4 therethrough in emergency.

The feature of this embodiment is in that hook portions 22a and 22b are provided at two places on the right and left end of the conductive plate 21, in which the hook portions 22a and 22b have a two-step bend and are faced inward to each other.

The disc tray 4 is provided with hook holes 23a and 23b at positions facing the hook portions 22a and 22b. The conductive plate 21 is mounted from the direction of the front surface of the disc tray 4 as indicated by the arrow shown in FIG. 3 in such a way that the bent portions in the structure of the hook portions 22a and 22b are mounted into the hook holes 23a and 23b to the disc tray 4 side.

For the steps of mounting the conductive plate 21, the hook 22a is first hooked on the hook hole 23a on the disc tray 4 side, and the hook 22 is then pushed into the hook hole 23b for engagement.

It is possible to readily and reliably mount the conductive plate 21 on the disc tray 4 with the structure of the hook portions 22a and 22b at two places. Moreover, the structure of the hook portions 22a and 22b is provided in the lateral direction of the conductive plate 21, so that it is possible to reduce the thickness of the mounting part of the conductive plate 21 with no restriction on the height dimension of the mounting part of the conductive plate 21.

Furthermore, the positioning accuracy of the conductive plate 21 in the lateral direction with respect to the disc tray 4 is improved with the structure of the hook portions 22a and 22b at two places. In addition, mounting the conductive plate 21 from the front surface of the disc tray 4 allows mounting with no consideration of components or the like mounted on the back surface of the disc tray 4, and workability is also improved.

As shown in FIG. 4, the conductive plate 21 is provided with a pressure bar spring 24 having a one-step bend at the side end. This pressure bar spring 24 is provided to contact the pressure bar spring 24 with the bottom case 3 to be the shell when loading the disc tray 4 into the inside of the drive. Thus, when the finger touches the conductive plate 21 through the front bezel by the user charged with static electricity pressing the eject switch 12, the static electricity is discharged through the cabinet.

Figure 5:
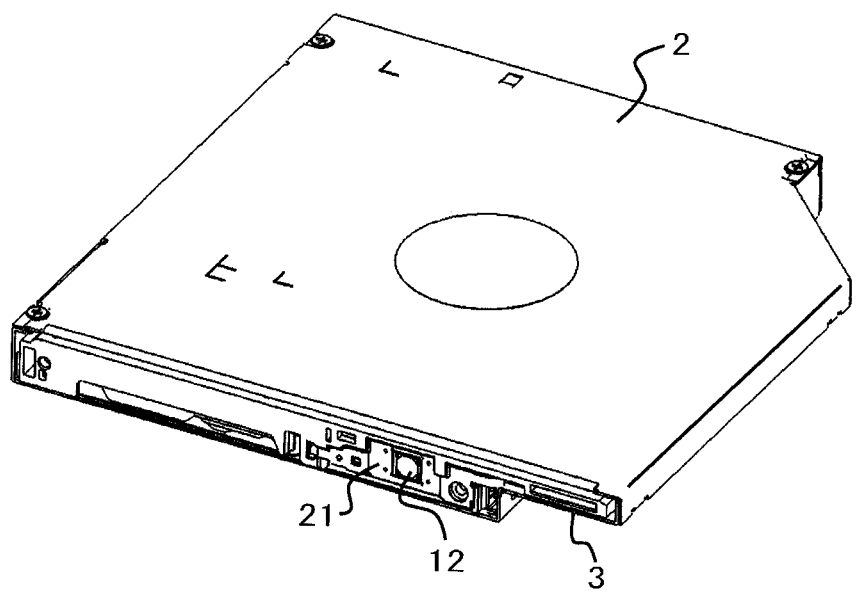
FIG. 5 is a perspective view depicting the disc drive having the conductive plate according to an embodiment of the present invention incorporated therein.
Figure 6:
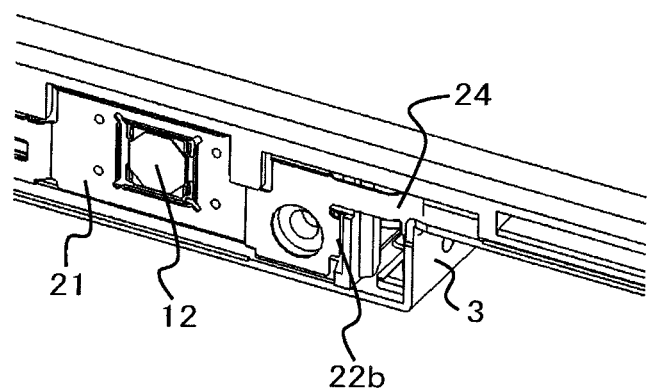
FIG. 6 is an enlarged perspective view partially depicting the disc drive shown in FIG. 5.

FIGS. 5 and 6 show the contact state between the conductive plate 21 and the bottom case 3 when the disc tray 4 is loaded into the inside of the drive in the optical disc drive 1 using the conductive plate 21 according to an embodiment of the present invention.

FIG. 5 is a perspective view depicting the disc drive having the conductive plate according to an embodiment of the present invention incorporated therein. FIG. 6 is an enlarged perspective view partially depicting FIG. 5.

In FIGS. 5 and 6, the conductive plate 21 is mounted on the disc tray 4 using the hook portions 22a and 22b at two places (only the hook portion 22b is shown in the drawing), in which the pressure bar spring 24 provided at the side end of the conductive plate 21 is contacted with the bottom case 3 to be the cabinet of the optical disc drive 1 by the elastic force of the bent pressure bar spring 24 with the disc tray 4 loaded in the inside of the optical disc drive 1.

The pressure bar spring 24 is bent in the direction of the disc tray 4, and the pressure bar spring 4 presses the cabinet with a moderate elastic force, so that the conductive plate 21 does not extend to the user side.

Figure 7:
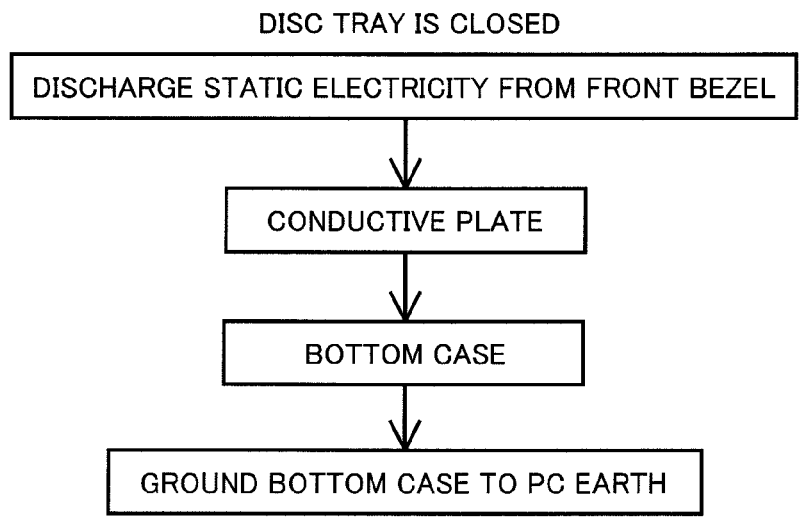
FIG. 7 is a block diagram depicting a flow of static electricity discharge in the optical disc drive having the conductive plate according to an embodiment of the present invention incorporated therein.

FIG. 7 is a block diagram depicting a flow of static electricity discharge in the optical disc drive having the conductive plate according to an embodiment of the present invention incorporated therein.

In FIG. 7, when the user touches the eject switch 12 or the like provided on the front bezel, static electricity carried from the human body to the optical disc drive 1 is first carried to the conductive plate 21. In the state in which the disc tray 4 is loaded in the inside of the disc drive 1, the static electricity is then carried from the pressure bar spring 24 provided on the conductive plate 21 to the bottom cover 3 to be the cabinet of the optical disc drive 1.

Moreover, since the bottom case 3 of the optical disc drive 1 incorporated in a PC or the like is grounded to a PC earth, the static electricity is reliably discharged.

Accordingly, even in the case where static electricity is carried through the optical disc drive 1, it is possible to reliably prevent malfunction of or damage to the internal electric components caused by static electricity, and to improve the reliability of the optical disc drive 1 against static electricity.

Second Embodiment

A second embodiment of the present invention will be described with reference to FIGS. 8 and 9.

Figure 8:
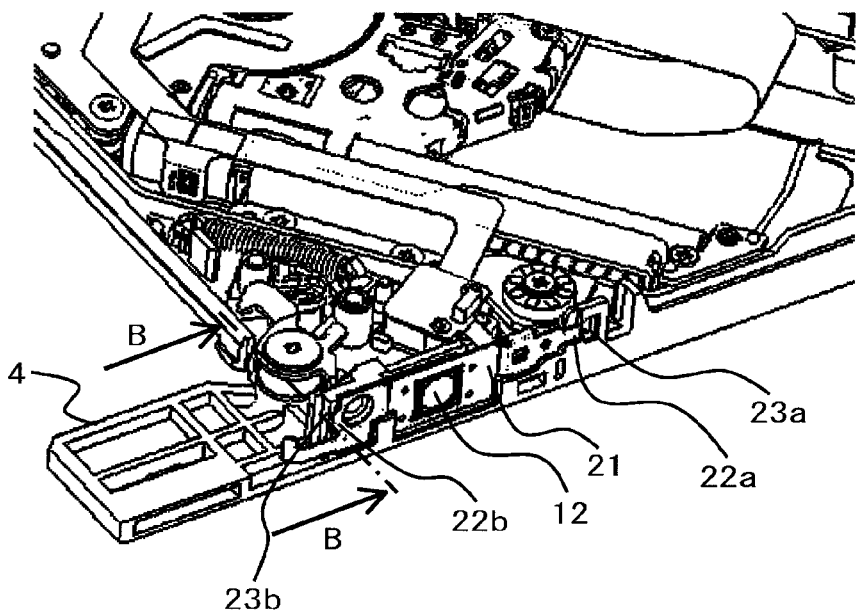
FIG. 8 is a perspective view depicting a disc drive having a conductive plate according to a second embodiment of the present invention incorporated therein.

FIG. 8 is a perspective view depicting a disc drive having a conductive plate according to the second embodiment of the present invention incorporated therein.

Figure 9:
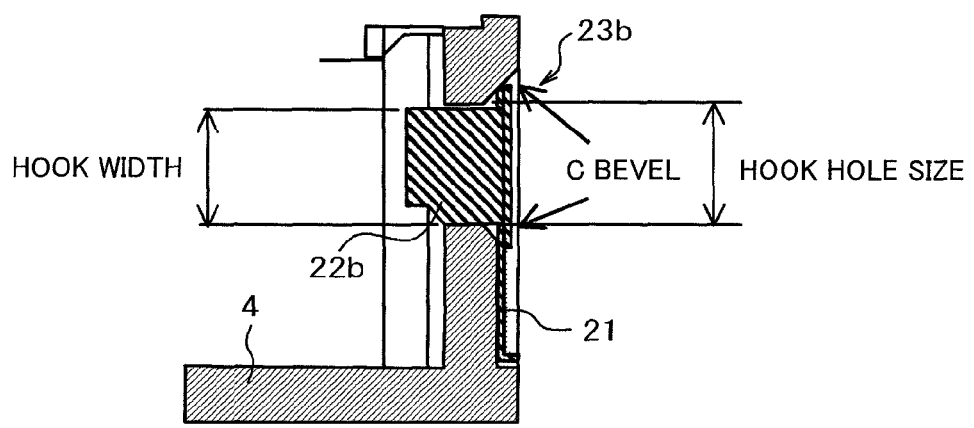
FIG. 9 is a cross sectional view on line B-B shown in FIG. 8.

FIG. 9 is a cross sectional view on line B-B shown in FIG. 8.

In FIGS. 8 and 9, the feature of this embodiment is in that the vertical internal dimension of a hook hole 23b provided in a disc tray 4 is formed with a positive tolerance ranging from 0.05 to 0.2 mm, based on the width dimension of a hook portion 22b provided on a conductive plate 21.

For example, in the case where the height dimension of the front surface of the disc tray 4 is 10 mm, the positioning accuracy of the conductive plate 21 in the vertical direction is estimated at 2% or less. Moreover, workability is improved with no load resistance in mounting the conductive plate 21 if the minimum tolerance is about 0.05 mm. Furthermore, another feature is in that a C bevel structure (a bevel structure in a tapered shape) of about 0.5 mm is provided on the conductive plate 21 side in the depth direction of the hook hole 23b. Since this beveling is provided on the upper and lower surface of the hook hole 23b, accurate positioning is possible because the upper and lower part of the conductive plate 21 are contacted with the beveled portions.

Of cause, the C bevel structure is used in a hook portion 22a and a hook hole 23a on the other side. Thus, it is possible to eliminate load resistance in mounting the conductive plate 21 on the disc tray 4 and to position the conductive plate 21 in the height direction. Therefore, it is possible to improve workability in assembly and to reduce damage or the like to the conductive plate 21 in assembly. Accordingly, it is possible to implement the assembly of the optical disc drive 1 with excellent accuracy and to provide the optical disc drive 1 of high reliability.

As described above, according to the present invention, even in the case where a user charged with high voltage static electricity operates the optical disc drive, the static electricity can be reliably grounded to the cover formed of a conductive member to be a drive cabinet through the conductive plate provided on the front end portion of the disc tray, so that it is possible to avoid malfunction of electronic components or electrostatic discharge damage or the like to electronic components and a laser diode.

Moreover, the conductive plate has the hook structure at two places on the right and left, and the conductive plate is mounted using the hole structure in which the hook portions are reliably hooked on the disc tray. Thus, it is unnecessary to consider an increase in the dimensions of this portion in the height direction with no restriction on the dimensions of the disc tray in the vertical direction.

Furthermore, in the assembly process steps of the disc drive, the conductive plate is fit into the front end portion of the disc tray, so that it is possible to improve assembly workability with no influence on the assembly process steps of the upper and lower part of the disc tray.

From the description above, it is possible to provide a highly reliable optical disc drive that can solve the problems of static electricity on the optical disc drive.

What is claimed is:

1. An optical disc drive comprising:
    a cabinet formed of a top case and a bottom case, the cabinet having an opening;

a disc tray housed in an inside of the cabinet, and provided to have a disc loaded thereon, or unloaded therefrom, through the opening;

an optical pickup configured to record on, and configured to reproduce information from, the disc on the disc tray;

a spindle motor configured to rotate and drive the disc; and a conductive plate provided on a front end portion of the disc tray;

wherein the conductive plate includes:
- hook portions provided on tip end portions of the conductive plate at two places, one on a right tip end and one on a left tip end, each of the hook portions having a two-step bend, and the hook portions disposed to face inward to each other, and
- a pressure bar spring portion provided on a side end of the conductive plate, the pressure bar spring portion having a one-step bend;

wherein the conductive plate is fixed to hook holes provided on a front surface of the disc tray, by using the hook portions; and wherein the pressure bar spring portion is in contact with and grounded to a shell with the disc tray loaded in the inside of the cabinet.

2. The disc drive according to claim 1,
wherein the pressure bar spring portion is bent in a direction of the disc tray.

3. The disc drive according to claim 1,
wherein a vertical internal dimension of the hook hole provided on the disc tray is formed with a positive tolerance ranging from 0.05 to 0.2 mm with respect to a width dimension of the hook portion provided on the conductive plate.

4. The disc drive according to claim 1,
wherein an inlet side of the hook hole provided on the disc tray is beveled.

5. The disc drive according to claim 4,
wherein an upper and lower surface of an inlet of the hook hole provided on the disc tray are beveled.

6. An optical disc drive comprising:
a cabinet, including a top case and a bottom case, and having an opening;

a disc tray, housed inside the cabinet, and configured to move through the opening to enable a disc to be loaded thereon, or alternatively, to be unloaded therefrom;

an optical pickup, configured to record on, and configured to reproduce information from, the disc on the disc tray;

a spindle motor, configured to rotate the disc; and a conductive plate, configured on a front end portion of the disc tray, the conductive plate including:
- hook portions configured on tip end portions of the conductive plate, at two places, one on a right tip end and one on a left tip end, each of the tip end portions disposed to be bent towards the longitudinal direction of the conductive plate, and each of the hook portions having a two-step bend, and the hook portions disposed to face inward to each other, and
- a pressure bar spring portion configured on a side end of the conductive plate, having a one-step bend;

wherein the conductive plate is fixed to hook holes configured on a front surface of the disc tray, by using the hook portions; and wherein the pressure bar spring portion is in contact with and grounded to a shell with the disc tray loaded in the inside of the cabinet.

7. The disc drive according to claim 6,
wherein the pressure bar spring portion is configured so as to be bent in a direction of the disc tray.

8. The disc drive according to claim 6,
wherein a vertical internal dimension of the hook hole configured on the disc tray is configured to have a positive tolerance ranging from 0.05 mm to 0.2 mm with respect to a width dimension of the hook portion configured on the conductive plate.

9. The disc drive according to claim 6,
wherein an inlet side of the hook hole configured on the disc tray is beveled.

10. The disc drive according to claim 9,
wherein an upper and lower surface of an inlet of the hook hole configured on the disc tray are beveled.

* * * * *